Nov. 19, 1957  R. E. ROBERTS  2,813,573
METHOD AND APPARATUS FOR MAKING CORRUGATED FLEXIBLE HOSE
Filed July 2, 1954  2 Sheets-Sheet 1
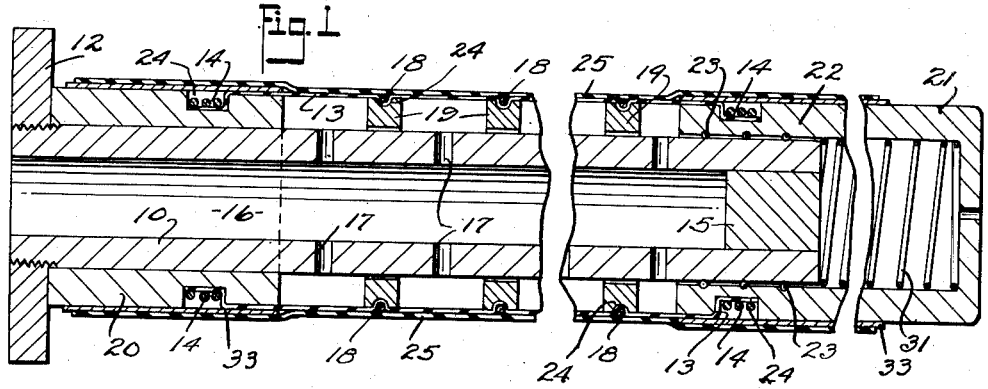
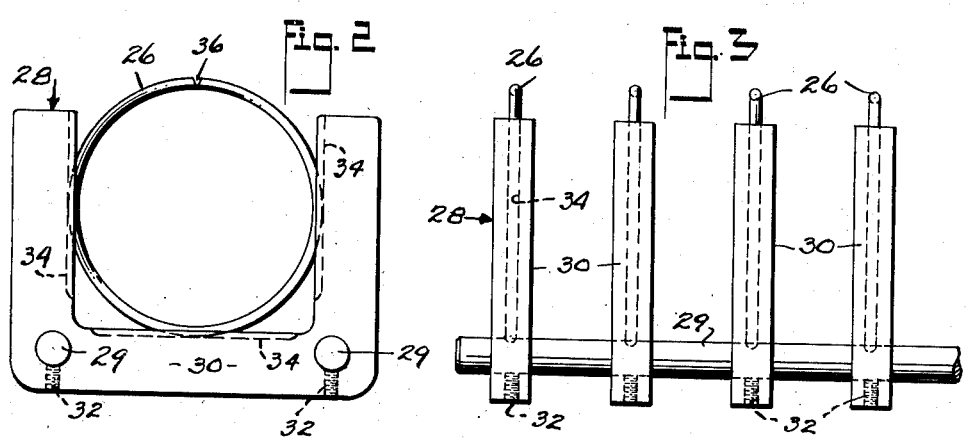
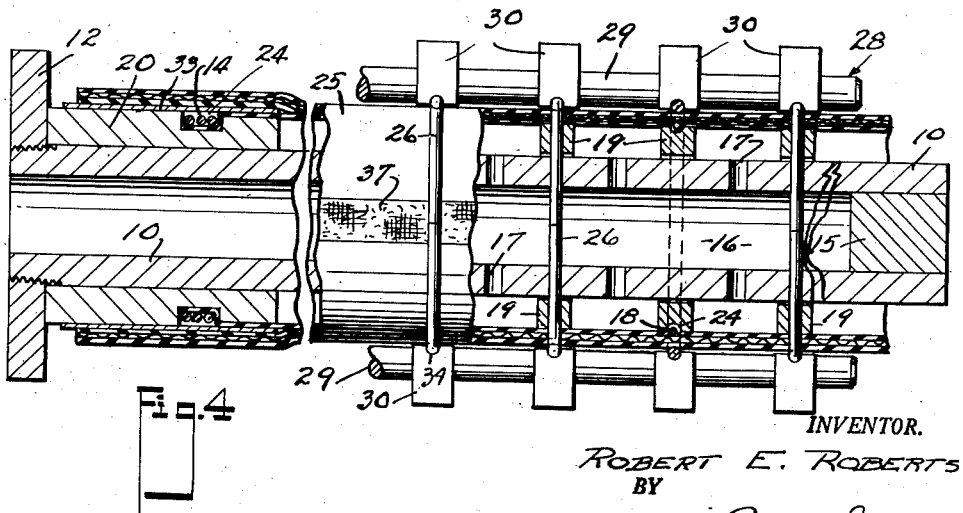
INVENTOR.
ROBERT E. ROBERTS
BY
Bates, Peare & McBean
ATTYS.

Nov. 19, 1957  R. E. ROBERTS  2,813,573
METHOD AND APPARATUS FOR MAKING CORRUGATED FLEXIBLE HOSE
Filed July 2, 1954  2 Sheets-Sheet 2
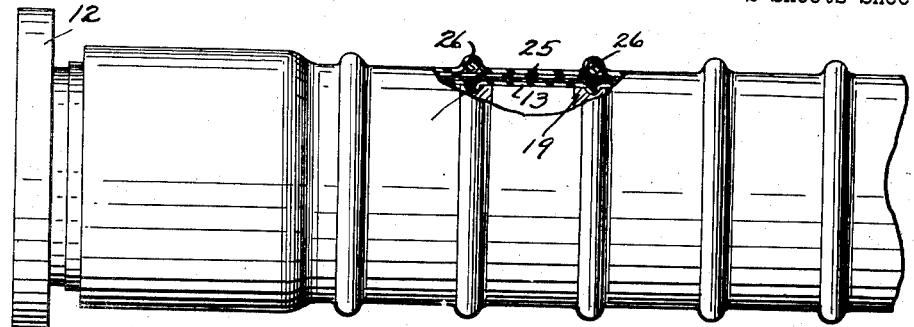
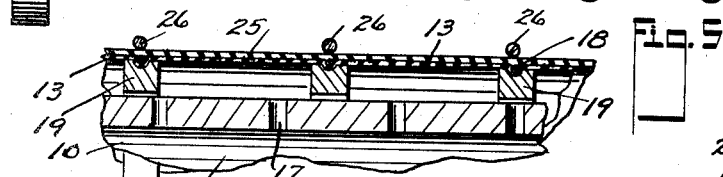
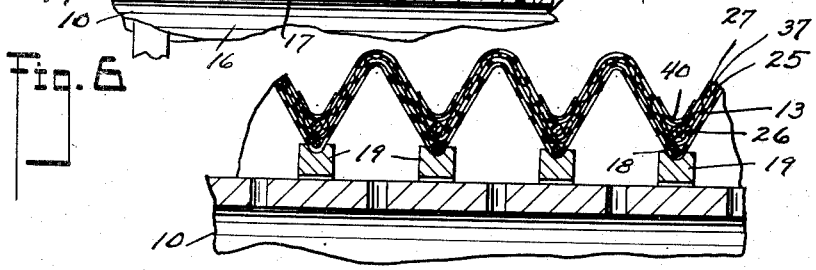
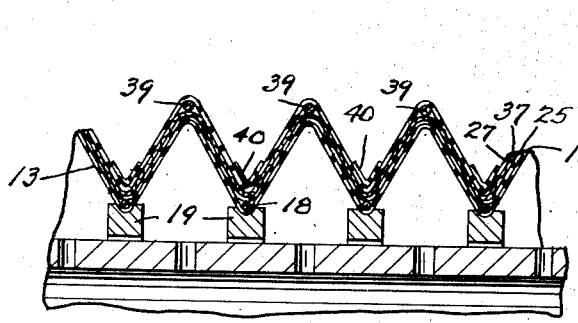
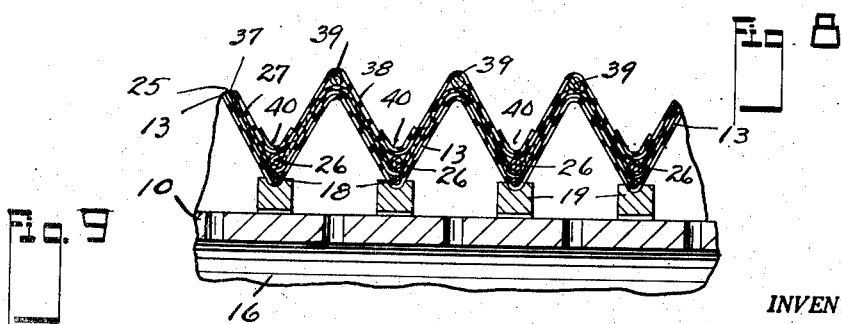
INVENTOR.
ROBERT E. ROBERTS
BY
Bates, Peare & M<sup>c</sup>Bean
ATTYS United States Patent Office 2,813,573
Patented Nov. 19, 1957

2,813,573
METHOD AND APPARATUS FOR MAKING CORRUGATED FLEXIBLE HOSE

Robert E. Roberts, Wilton, Conn.

Application July 2, 1954, Serial No. 441,107

14 Claims. (Cl. 154—7)

This invention relates to corrugated reinforced flexible hose having annular corrugations, and to a method and apparatus for making the same.

Sections of hose of relatively short lengths used as conduits for the cooling system of internal combustion engines must be capable of resisting collapse on the suction end of the cooling system and of resisting swelling and bursting on the pressure end of the system. Hose for this purpose must embrace, for an inch or more, the metal connecting ends of the cooling system to be joined thereby. Accordingly it is necessary that the hose, although strong, must be flexible and compressible so that it can be compressed into the space between the metal connections and then forced over the metal ends and be clamped firmly in position thereon to prevent leakage. The stiff inflexible hose commonly used is very difficult to attach, especially if the distance between the connections is relatively short, and when in place the vibration of the engine causes such inflexible hose to break the metal connection from the radiator block. Accordingly, it is an object of this invention to provide an improved flexible hose which will overcome the disadvantages above mentioned.

As it is desirable that the hose, with which this invention is concerned, be vulcanized in mold cavities, an additional object of this invention is to provide a method and apparatus by means of which the hose may be formed to the shape and size of a mold cavity while in raw form and thereby avoid the defects which commonly occur during the vulcanization of hollow rubber articles as a result of their not being properly and accurately formed before they are placed in the molds. Additionally, however, the invention contemplates a hose construction as well as method and apparatus for forming the same by means of which the formed hose can, if desired, be vulcanized without molds or mandrels, as for example in an "open" steam curing apparatus.

The invention contemplates the provision of a flexible annularly corrugated reinforced hose having inner and outer annular corrugated envelopes, with reinforcing means therebetween, and which hose is vulcanized after formation. The invention includes the use of metallic rings as reinforcements. Such rings may be positioned in the crests and/or the troughs of the annular corrugations of the hose. Suitable metallic rings may be made on an automatic machine of the type commonly used for producing close coiled springs of any given diameter and any number of coils. Such machines are well known and generally include an automatic cut-off which may be set to cut just one coil at a time and to so cut this coil that the ends of the wire forming the coil either meet, are spaced apart, or overlap, as is desired. The ends of the rings may be spot-welded together if desired. However, I prefer to use rings which form one complete circle with the ends of the wire substantially touching, and I prefer to leave the rings in this open state while in the hose.

The apparatus includes an inflatable body supported by a rigid form together with means for inflating the body against the wall of the hose to corrugate it annularly and hold it in corrugated condition while completing the wall with reinforcements after which the corrugated hose may be removed from the inflatable body and vulcanized.

In the drawings,

Fig. 1 is a longitudinal axial section through an apparatus or mandrel for forming the hose, the latter being partially formed thereon;

Fig. 2 is an end view of a spacing frame for use in connection with the application of metallic reinforcing rings to the partially formed hose;

Fig. 3 is a fragmentary side elevation of the spacing frame of Fig. 2;

Fig. 4 is a fragmentary longitudinal sectional view similar to Fig. 1 but illustrating the manner of positioning the reinforcing rings on the partially formed hose;

Fig. 5 is an elevation, partially broken away, and illustrates the reinforcing rings in position and overlaid by an outer wall covering prior to inflation;

Fig. 6 is a fragmentary enlarged longitudinal section illustrating a portion of the hose on the mandrel prior to the inflation of the mandrel;

Fig. 7 is a fragmentary longitudinal section similar to Fig. 6 but illustrating the mandrel in an inflated condition;

Fig. 8 is a view similar to Fig. 7 but illustrating a hose formed with metallic reinforcing rings in the crests rather than in the troughs of the hose;

Fig. 9 is a view similar to Figs. 7 and 8 illustrating the use of metallic reinforcing rings in both the crests and troughs.

Referring now to the drawings and particularly to Fig. 1, it will be seen that there is provided a mandrel having a rigid tubular base portion 10 provided at one end with a flange 12 for attachment to a turning lathe, not shown. This flange is attached to the face plate of the lathe in an air-tight manner with suitable packing so that compressed air from a suitable source of supply may enter the central bore 16 of the mandrel base 10. The opposite end of the mandrel base 10 is closed as by a plug 15. Compressed air entering the central bore 16 may pass through radial ports or passageways 17 formed in the base 10 to expand an inflatable body 13 which forms part of the mandrel.

The inflatable body 13 comprises a flexible stretchable tube of cured rubber, or similar composition material, and is attached at its ends by wire wrappings 14, to enlarged sleeve like formations 20 and 21 carried by the mandrel base 10. As shown in Fig. 1, the left hand sleeve 20 is fixed to the mandrel base 10, while the right hand sleeve 21 is in the nature of a cap and has an elongated tubular portion 22 which telescopically embraces the end of the mandrel base 10, and is axially slidable thereon. Suitable packing 23 serves to prevent loss of pressure along the coacting surfaces of the sleeve 21 and the mandrel base 10. The inflatable body 13 extends across and is secured, as by wrappings 18 to a series of equi-spaced rings 19 which are axially slidable on the mandrel base 10. A coiled spring 31 is interposed between the right hand end of the mandrel body 10 and the right hand sleeve 22 as shown in Fig. 1 and serves to tension the inflatable body, maintaining it in the position shown in Fig. 1, in the absence of the expanding pressure heretofore mentioned. It will be noted that the windings 14 and 18 which secure the rubber sleeve 13 to the mandrel sleeves 20 and 21, and to the rings 19, overlie annular recesses 24 formed in such sleeves and rings so that the surfaces of these windings are flush with the surface of the rubber body 13 when the mandrel is not inflated.

The wall of the hose may be made by first applying a rubber tube 25 to the inflatable body 13. To facilitate this, a thin-walled tubular metal shim 33 is placed on each end of the mandrel to cover the ends of the inflatable body which extend over the sleeves 20 and 21 respectively. The rubber tube 25, which is to form the inner surface of the hose, is slipped over the unsupported right hand end of the mandrel to the position indicated in Fig. 1. The shims 33 remain in the ends of the hose after the wall is formed and until after vulcanization to insure a smooth exact inner diameter at the ends of the hose and thereby facilitate the connection of the hose to the cooling system inlet and outlets. Following vulcanization the shims 33 are removed.

Instead of a rubber tube the tube 25 may be made of a flexible stretchable rubberized fabric. The tube 25 is applied while the mandrel is stretched axially to its full length with the inflatable body forming a tube as indicated in Fig. 1. After the tube 25 and the shims 33 have been positioned on the inflatable body 13 a series of spaced reinforcing rings 26 are slid into position over the mandrel. As heretofore mentioned those rings are formed of single loops of wire the ends of which may be welded together to form a complete annulus or may overlap as desired. However, I prefer that such rings form one substantially complete circle with their ends just touching but not secured together.

The reinforcing rings 26 are applied by means of a spacing frame 28 which holds them in an upright position and equally spaced from each other. It will be noted that the spacing of these rings are the same as the spacing of the retaining rings 19 heretofore described as supporting the inflatable body 13. The spacing frame 28 as shown in Figs. 2 and 3 is composed of a pair of rigid rods 29 and as many U-shaped frames 30 as is needed to hold the number of metal reinforcing rings required for the hose wall. The U-frames 30 are mounted on the rods 29 and are secured thereto and properly spaced by set screws 32. Each frame 30 has a groove 34 cut in its inner walls to receive and retain a metallic wire reinforcing ring, which is slid into the open upper end thereof, and retained in position thereby while the spacing frame is moved axially into position onto the mandrel. The inner diameter of the reinforcing rings 26 is slightly larger than the external diameter of the positioned inner hose wall 25. Accordingly they may be readily moved into position thereupon by movement of the spacing frame.

When the spacing frame has been moved axially to properly position the rings 26, the inflatable body 13 is inflated an amount sufficient to cause the inner hose wall to grip the wire reinforcing rings. The spacing frame 28 is then lowered and removed from contact with the reinforcing rings 26 leaving them in position on the hose wall 25. The hose wall is then completed by the application of the desired number of plies 27 of rubber, rubberized fabric, or stockinet which are cemented together with an adhesive compound which will set when the hose is vulcanized. The number of plies of material so applied is dependent on the thickness and strength needed for the purpose for which the hose is intended. The inner and outer layers of the hose wall may be made of "neoprene" or similar rubber-like compounds to render them resistant to oils, antifreeze solutions and the like.

When open end reinforcing rings 26 having a slight open space or gap as indicated at 36 in Figs. 2 and 4, are used, it is advisable to lay a narrow protecting strip of stretchable fabric, which may be rubberized if desired, longitudinally along the outer surface of the tubular inner hose wall 25 before applying the rings 26 thereto. The rings are then positioned by the spacer frame 28 so that the gaps 36 thereof align with each other and with the fabric strip 37. A second fabric protecting strip similar to the strip 37 may be applied over the open ends of the rings so that the ends of the rings will be encased in fabric.

Following the application of the outer hose layer or layers 27, the inflatable body 13 of the mandrel is fully inflated. This inflation is generally accompanied by an inward manual pressure on the sleeve 21 and results in a longitudinal shortening and a radial stretching of the hose and rubber tubular body 13 except where the latter is attached to the retaining rings 19 or overlies the sleeves 20 and 21. This provides the hose, which prior to inflation was substantially cylindrical as indicated in Fig. 6, with a series of annular axially spaced independent corrugations 40.

When it is desired to provide a hose with reinforcing rings in both the crests and troughs or solely in the crests of the corrugations; a second spacer frame, not shown, is provided. This second frame is substantially the same as the frame 28 heretofore described. However, it is constructed to receive the reinforcing rings 39 (Figs. 8 and 9) which are larger in diameter than those heretofore described. Likewise the U-shaped frame members 30 are spaced closer together than those which receive rings 26 for the troughs. The second spacer frame is filled with rings and slid axially over the free right hand end of the mandrel just prior to the completion of the inflation of the mandrel. The U-frames 30 of the second spacer frame, accordingly, are spaced so that when the frame is in position they will align with the crests of the corrugations 40. The inflatable body 13 is then completely inflated causing it to support the rings 39 whereupon this ring supporting frame 28 is lowered and removed from contact with the embracing rings and an outer protective coating of rubber-like material, stockinet, or rubberized fabric is wrapped about the tube.

When open end reinforcing rings are used for the crests of the corrugations they, like the rings 26 heretofore described, may be protected by fabric strips similar to those shown at 27 in Fig. 4.

After the inflatable body 13 has been fully inflated, bands 40 comprising narrow strips of cured rubber are wrapped about the hose in the troughs of the corrugations to bind the wall of the hose and prevent separation at the troughs. Similar bands are wrapped over the end portions of the hose which overlay the shims 23 to bind the layers together and extract any trapped air. Likewise when reinforcing rings are positioned at the crests of the corrugations, they too are overlaid with cured rubber bands or strips to prevent separation between the outer layer of material and such rings and to clinch the material around such rings. These cured rubber strands or strips remain on the hose until immediately prior to vulcanization at which time they are removed.

The formed hose is vulcanized in the usual manner following the removal of the binding strands or strips. Vulcanization may be accomplished in molds using internal pressure of air or steam. During such vulcanization the outer wall of the hose is given a good finish by contact with the surface of the mold while the rubber is soft and is being pressed against the mold surface by internal pressure. If desired the formed hose may be vulcanized without molds, as for example in an "open" steam curing apparatus.

The hose may be formed substantially as above described using, in place of the metal rings, cord saturated with an adhesive such as, when vulcanized will be sufficiently harder than the wall of the hose as will support such wall against either collapsing or swelling under suction or pressure as the case may be.

The apparatus above described and the method of building the wall of the hose to any desired thickness with any compounded vulcanizable material, while the hose wall is supported by the inflatable mandrel, makes it possible to produce a corrugated hose, with annular corrugations of great depth, and wherein the crests and/or the troughs of the corrugations may be reinforced with metal rings, or with cord to support the wall of the hose against collapsing under internal suction and from swelling under internal pressure. The apparatus facilitates the production of a hose which when completed may be shortened by compressing it like an accordion so that its ends may be easily slipped over the connections of the cooling system and then tightly anchored thereto with hose clamps.

By using such apparatus together with the rack for holding the metal rings to accurately place them in the proper spacing along the hose wall, so forms the hose that the space between the reinforcements allows for the corrugation of the wall between the reinforcements, without any lateral stretching of the wall. The wall of the hose between the reinforcements does stretch axially to make the increased outer diameter of the hose at the crests.

By having one end of the mandrel open unsupported, a tube of rubber may be used to form the inner surface of the hose wall. This as well as tubular stockinet for reinforcing the wall may be pulled over the rubber covered mandrel. However, if desired the entire hose wall may be made of all rubber laid on in layers, or rubberized fabric plied up over and under the metal ring reinforcements.

By vulcanizing the formed hose in molds using internal pressure of air or steam during vulcanization the outer wall of the hose is given a good finish by reason of its contact with the surface of the mold while the rubber is soft and is being pressed against the mold with the internal pressure.

The coiled spring 31 which bears against the end of the mandrel 10 and the cap or sleeve 21 holds the inflatable body 13 of the mandrel out to its full length. It has been found that this spring may be so tensioned as to require very little hand pressure by the operator to help compress it and thereby shorten the mandrel and inflatable body 13 as it is inflated. The inflation of the body 13 tends to shorten it and, as it shortens, the supporting rings 19 which are slidably mounted on the metal mandrel base 10 come closer together and the inflatable body 13 and the wall of the hose built upon it become inflated evenly and accurately.

I claim:

1. An apparatus for making corrugated flexible hose including a rigid elongated form, an inflatable tubular flexible body mounted on said form, a plurality of rigid annular members each movable axially of said form and being disposed under and secured at equi-spaced intervals to said inflatable body to prevent radial expansion of said body at spaced intervals and adapted to form the troughs of corrugations of said flexible hose.

2. An apparatus for making corrugated flexible hose including a rigid form having an inflatable tubular body secured thereto and about which stretchable material may be wrapped to form a tubular hose, means to inflate said body and stretch it radially, and retaining means connected to said body to prevent radial stretching thereof at individually axially spaced intervals, to thereby form a series of axially spaced individual annular troughs spaced by radially stretched body portions forming individual annular crests.

3. An apparatus according to claim 2 wherein said inflatable body is free to shorten axially as it is inflated, and said retaining means are interposed between said inflatable body and said rigid form and are movable axially relative to said form to permit such shortening.

4. An apparatus for forming hose, including an elongated rigid main body portion adapted to be supported at one end and having passageway adapted to be connected with a source of fluid pressure, said body having a telescopically arranged portion at its other end, an elongated flexible stretchable tubular fluid impervious body encircling said rigid body one end of said flexible body being secured to said main body with a fluid impervious connection, the other end of said flexible body being secured to said telescopic portion with a fluid impervious connection, resilient means interposed between said main and telescopic body portions and acting normally to stretch said flexible body axially and retain it in a substantially cylindrical form, means connected to said flexible body at axially spaced annular zones to prevent radial stretching of the flexible body in such annular zones while permitting radial expansion in annular zones intermediate the aforesaid zones, fluid passageways communicating with the first named passageway and with the space between said flexible and rigid bodies whereby the flexible body may be inflated to expand it radially in said intermediate annular zones and be contracted axially against the action of said resilient means.

5. An apparatus for forming hose, including a rotatable elongated rigid body portion supported at one end having a passageway adapted to be connected with a source of fluid pressure, said body having a cylindrical enlarged sleeve portion adjacent one end thereof, a second sleeve portion telescopically engaging the other end of said rigid body portion and movable axially relative thereto, a flexible tubular fluid impervious body encircling said rigid body portion and movable axially relative thereto and having one end thereof secured to said first named sleeve portion with a fluid impervious connection and its other end secured to said telescopic sleeve with a fluid impervious connection, means providing a fluid impervious connection between said telescopic sleeve and said body portion, a spring interposed between said telescopic portion and said rigid body portion and acting normally to stretch said tubular body axially and retain it in a substantially cylindrical form, a plurality of spaced rigid annular rings encircling said rigid body portion within said flexible body, said rings being axially slidable relative to said rigid body portion and being secured to said tubular body portion at axially equi-spaced intervals and passageways communicating with the first named passageway and with the space between said rings.

6. An apparatus for forming hose, including a rotatable elongated rigid body supported at one end for rotation and having an axial passageway extending therethrough and adapted to be connected with a source of fluid pressure, said body having a cylindrical enlarged sleeve portion adjacent one end thereof, means to plug the passageway at the other end thereof, a second sleeve telescopically engaging the other end of said body, a flexible tubular inflatable body encircling said rigid body and extending from one sleeve to the other, a fluid impervious connection securing one end of said inflatable body to said first named sleeve with a fluid impervious connection, a fluid impervious connection securing the second named sleeve and the other end of said inflatable body, spring means between said last mentioned sleeve and said rigid body to stretch said tubular body axially, a plurality of equi-spaced rigid annular rings encircling said rigid body within said tubular body, said rings being axially movable relative to said rigid body and being secured to said tubular body at axially equi-spaced intervals, and passageways communicating with the first named passageway and with the space between said rings whereby said inflatable body may be inflated to expand it radially in annular zones between its areas of attachment with said rings while the telescopic sleeve is being moved axially toward the rigid body to decrease the length of said inflatable body.

7. An apparatus for forming hose, including a rotatable elongated rigid body supported at one end, a stretchable inflatable flexible tubular fluid impervious body mounted and encircling said rigid body, means whereby the length of said inflatable body may be decreased as desired, means to supply said inflatable body with a fluid to inflate it and stretch it radially, means to retain a plurality of annular wire rings in alignment with and spaced equi-distant from each other while they are being moved axially into position encircling said tubular body, said body being inflatable to expand it radially and hold the rings in position thereon, said last named means having an open end whereby it may be moved radially relative to said inflatable body to withdraw it from said rings.

8. The method of making flexible hose comprising positioning a base layer of stretchable vulcanizable material on an inflatable radially stretchable cylindrical body, positioning a plurality of annular reinforcing rings on said layer at points spaced axially equi-distant from each other, building up a hose wall on said base layer and said rings by application of a second layer of stretchable vulcanizable material, inflating said body to stretch it radially while permitting axial shortening thereof and while preventing radial stretching thereof in the regions encircled by said reinforcing rings to thereby form a series of parallel axially spaced annular corrugations in said material with the reinforcing rings embedded in the troughs thereof, deflating the body and removing the formed hose therefrom, and subsequently vulcanizing said formed hose.

9. The method of making flexible hose comprising positioning a base layer of stretchable vulcanizable material on an inflatable radially stretchable cylindrical inflatable body having thin-walled metallic cylindrical shims embracing its ends while retaining said body substantially cylindrical, building up a hose wall on said base layer by the application of a second layer of stretchable vulcanizable material thereto, inflating said body to stretch it radially while shortening it axially and while preventing radial stretching thereof in a plurality of equi-spaced narrow annularly extending regions, thereby forming a series of parallel axially spaced annular corrugations in said layers, applying a reinforcing ring to the crest of each of said corrugations, increasing the inflation of said body to cause said last named rings to be held in position on said material applying an external coating of thin material to cover the last named layer of material and said rings, wrapping the body with strip of cured rubber in the base of the trough and at the crests of each of the corrugations and overlaying said shims, deflating the body and removing the formed hose therefrom, removing said strips, subsequently vulcanizing said hose, and thereafter removing said shims.

10. The method of making flexible hose comprising positioning a tubular base layer of stretchable vulcanizable material on an inflatable radially stretchable cylindrical body, positioning a plurality of annular wire reinforcing rings on said layer at points spaced axially equi-distant from each other, partially inflating said body to retain said rings in position thereon, building up a hose wall on said base layer and rings by the application of a second layer of stretchable vulcanizable material, further inflating said body to stretch it radially while shortening it axially and while preventing radial stretching thereof in the regions overlaid by said reinforcing rings, thereby forming a series of parallel axially spaced annular corrugations in said material with the reinforcing rings embedded in the troughs thereof, applying a reinforcing ring to the crest of each of said corrugations, increasing the inflation of said body to cause said last named rings to be held in position thereon, applying an external protective coating of thin material to cover the last named layer of material and the last named rings, deflating the body and removing the formed hose therefrom, and subsequently vulcanizing said formed hose.

11. The method according to claim 10 wherein the reinforcing rings are placed in a rack in alignment with and spaced equi-distant from each other, simultaneously moving said rack and rings axially to position them relative to the inflatable body, and moving the rack radially away from said rings following the retention of the rings on the inflatable body by inflation of the same.

12. The method according to claim 10 using open-ended rings and including the step of applying a narrow axially extending stretchable fabric strip to the layers on the inflatable body, thereafter positioning the rings with their open ends overlaying said strip, and thereafter applying a second narrow stretchable fabric strip to extend across and protect the open ends of said rings.

13. The method of making flexible hose comprising positioning a base layer of stretchable vulcanizable material on an inflatable radially stretchable cylindrical body, inflating said body to stretch it radially while permitting axial shortening thereof to thereby form a series of parallel axially spaced annular corrugations in said material, applying a reinforcing ring to the crest of each of said corrugations, increasing the inflation of said body to cause said rings to be held in position on said material, building up a hose wall on said base layer and said rings by application of additional stretchable vulcanizable material, deflating the body and removing the formed hose therefrom, and subsequently vulcanizing said formed hose.

14. An apparatus for making corrugated flexible hose including a rigid elongated form having an inflatable tubular flexible body extending thereover, a plurality of spaced rigid rings encircling said rigid form within said flexible body and being secured at equi-spaced intervals to said inflatable body to prevent radial expansion of said inflatable body at spaced intervals and thereby form the troughs of corrugations in said body when inflated.

References Cited in the file of this patent

UNITED STATES PATENTS

| | | |
|---|---|---|
| 2,394,270 | Swain | Feb. 5, 1946 |
| 2,396,059 | Roberts | Mar. 5, 1946 |
| 2,486,763 | Roberts | Nov. 1, 1949 |
| 2,490,513 | Dreyer | Dec. 6, 1949 |
| 2,524,679 | Roberts | Oct. 3, 1950 |
| 2,584,501 | Roberts | Feb. 5, 1952 |
| 2,644,487 | Schindler et al. | July 7, 1953 |
| 2,712,157 | Holte | July 5, 1955 |
| 2,713,381 | Seck | July 19, 1955 |

FOREIGN PATENTS

| | | |
|---|---|---|
| 652,810 | Great Britain | May 2, 1951 |